US011178828B2

(12) United States Patent
Henry et al.

(10) Patent No.: US 11,178,828 B2
(45) Date of Patent: Nov. 23, 2021

(54) IRRIGATION SYSTEM

(71) Applicant: The Board of Trustees of the University of Arkansas, Little Rock, AR (US)

(72) Inventors: Christopher G. Henry, Stuttgart, AR (US); Brian Koehler, Ainsworth, IA (US); Jim Nichols, Caro, MI (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 274 days.

(21) Appl. No.: 16/471,699

(22) PCT Filed: Dec. 15, 2017

(86) PCT No.: PCT/US2017/066827
§ 371 (c)(1),
(2) Date: Jun. 20, 2019

(87) PCT Pub. No.: WO2018/118712
PCT Pub. Date: Jun. 28, 2018

(65) Prior Publication Data
US 2019/0307083 A1    Oct. 10, 2019

Related U.S. Application Data

(60) Provisional application No. 62/438,545, filed on Dec. 23, 2016.

(51) Int. Cl.
*A01G 25/02*        (2006.01)
*A01G 25/06*        (2006.01)
(Continued)

(52) U.S. Cl.
CPC ............. *A01G 25/02* (2013.01); *A01G 25/06* (2013.01); *E02B 13/00* (2013.01); *F16K 1/22* (2013.01);
(Continued)

(58) Field of Classification Search
CPC ...... A01G 25/02; A01G 25/06; A01G 25/167; A01G 25/16; F16K 1/22; F16K 37/005; E02B 13/00; E02B 13/02
See application file for complete search history.

(56) References Cited

U.S. PATENT DOCUMENTS 4,180,348 A * 12/1979 Taylor ..................... E02B 13/00
                                                    405/37
4,293,237 A * 10/1981 Robey .................... A01G 25/06
                                                    405/39
(Continued)

FOREIGN PATENT DOCUMENTS

CN         105421566 A       3/2016

OTHER PUBLICATIONS

"A guide to common hydraulic symbols" by www.engineeringclicks.com published on Oct. 2018. See at least p. 6 (Year: 2018).*
(Continued)

*Primary Examiner* — David Colon-Morales
(74) *Attorney, Agent, or Firm* — Michael Best & Friedrich LLP

(57) ABSTRACT

A gravity irrigation system includes a distribution piping having apertures to distribute water to a field, and a valve located upstream of the distribution piping. The valve limits a pressure of the water being delivered to the distribution piping. The system also includes a sump to receive the water at a lowest elevation of the field, a depth sensor disposed within the sump, and a return pump disposed at least partially within the sump to move the water to an elevated (Continued)

portion of the field. The system also includes a motor to drive the return pump, and a power source coupled to a variable frequency drive that powers the motor and controls a motor speed proportionately to an indication of the depth sensor. The system also includes a transfer piping to bring the water from the return pump to a check valve and to the distribution piping.

16 Claims, 10 Drawing Sheets

(51) Int. Cl.
*E02B 13/00* (2006.01)
*H02S 10/40* (2014.01)
*H02S 20/30* (2014.01)
*F16K 1/22* (2006.01)
*F16K 37/00* (2006.01)

(52) U.S. Cl.
CPC ............ *F16K 37/005* (2013.01); *H02S 10/40* (2014.12); *H02S 20/30* (2014.12); *Y02E 10/50* (2013.01); *Y02P 60/12* (2015.11); *Y02P 60/14* (2015.11)

(56) References Cited

U.S. PATENT DOCUMENTS

| | | | | |
|---|---|---|---|---|
| 4,538,377 A * | 9/1985 | Thornton | ............... | A01G 25/06 405/39 |
| 4,611,617 A * | 9/1986 | Hewitt | ................... | A01G 25/16 137/68.16 |
| 4,721,408 A * | 1/1988 | Hewlett | ................. | E02B 13/00 210/170.01 |
| 4,930,934 A * | 6/1990 | Adkins | ................. | A01G 25/06 137/601.18 |
| 4,961,538 A * | 10/1990 | Hewitt | ................... | F16K 1/221 137/269 |
| 5,059,064 A * | 10/1991 | Justice | ...................... | E02F 5/10 405/37 |
| 5,133,622 A * | 7/1992 | Hewlett | ................. | A01G 25/06 405/39 |
| 5,192,426 A * | 3/1993 | DeCoster | .................. | E03B 1/04 210/117 |
| 5,465,434 A * | 11/1995 | Coe | ........................... | F17D 1/13 4/546 |
| 5,547,589 A | 8/1996 | Carroll, II | | |
| 5,573,349 A * | 11/1996 | Paoluccio | .......... | B01D 17/0202 210/170.03 |
| 5,848,856 A * | 12/1998 | Bohnhoff | ................. | E02B 11/00 405/36 |
| 5,878,953 A * | 3/1999 | Coffman | ................. | A01G 25/16 239/1 |
| 5,944,444 A | 8/1999 | Motz et al. | | |
| 6,109,827 A | 8/2000 | Holloway, Jr. | | |
| 6,508,078 B2 * | 1/2003 | Sower | ..................... | C02F 11/20 62/532 |
| 8,457,799 B2 * | 6/2013 | Cox | ........................ | A01G 25/02 700/284 |
| 8,877,048 B1 * | 11/2014 | Owings | ................... | E03F 1/002 210/170.03 |
| 8,919,038 B2 * | 12/2014 | Jensen | ................... | A01G 31/02 47/48.5 |
| 9,556,048 B1 * | 1/2017 | Owings | ................... | C02F 3/327 |
| 10,299,448 B2 * | 5/2019 | Canyon | ................ | A01G 25/167 |
| 2003/0019150 A1 * | 1/2003 | St.Onge | ................... | C02F 1/78 47/1.01 R |
| 2008/0142614 A1 * | 6/2008 | Elezaby | ................. | A01G 25/16 239/69 |
| 2010/0145623 A1 * | 6/2010 | Eckerle | ................ | A01G 25/167 702/19 |
| 2011/0174706 A1 * | 7/2011 | Russell | .................. | A01G 25/00 210/170.01 |
| 2012/0175425 A1 * | 7/2012 | Evers | .................... | A01G 25/167 239/1 |
| 2013/0022475 A1 | 1/2013 | Atchia | | |
| 2013/0211717 A1 * | 8/2013 | Abts | ...................... | A01G 25/16 701/485 |
| 2013/0253713 A1 * | 9/2013 | VanWagoner | ......... | A01G 25/16 700/284 |
| 2014/0365021 A1 * | 12/2014 | Workman | ............ | A01G 25/167 700/284 |
| 2015/0096624 A1 | 4/2015 | Larkin | | |
| 2016/0219804 A1 * | 8/2016 | Romney | ............... | A01G 25/167 |
| 2019/0174687 A1 * | 6/2019 | Lynn | ...................... | F04B 49/06 |

OTHER PUBLICATIONS

International Search Report, PCT/US2017/066827, dated Feb. 23, 2018.
Written Opinion, PCT/US2017/066827, dated Feb. 23, 2018.

* cited by examiner

IRRIGATION SYSTEM

CROSS-REFERENCE TO RELATED APPLICATIONS

This application is a national stage filing under 35 U.S.C. § 371 of International Patent Application No. PCT/US2017/066827, filed Dec. 15, 2017, which claims priority to U.S. Provisional Patent Application No. 62/438,545, filed Dec. 23, 2016, the entire contents of each of which are incorporated herein by reference.

STATEMENT REGARDING FEDERALLY SPONSORED RESEARCH OR DEVELOPMENT

The present invention was made with United States Government support under Grant No. DE-FG36-08G088036 awarded by the Department of Energy (DOE). The United States Government has certain rights in the invention.

BACKGROUND

Agricultural irrigation systems in Arkansas and the mid-south region of the U.S. as well as portions of the California Central Valley primarily rely on furrow and flood-irrigation methods to provide water to crops in fields. Further, furrow and flood-irrigation methods are widely used throughout the world, including for example Argentina, Brazil, China, India, Pakistan and several European countries. These methods include pumping water onto a sloped field planted with crops, and allowing the water to move through the field from a higher elevation to a lower elevation to provide water to reach rows of crops.

Currently, irrigation systems in these regions use approximately 90% of available groundwater resources, as well as aquifers, as sources of water for the irrigation systems. However, groundwater is limited and the current rate of removal of water from aquifers in the U.S. is about twice the sustainable rate. There are several methods that have been developed to improve irrigation efficiency. One method is commonly referred to as tail-water recovery. This method collects tail-water runoff (i.e., water that has moved through the field to the lower elevation, and has not been absorbed into the soil or crops) and returns it to an irrigation supply source. Conventionally, tail-water recovery is performed using large tail-water pits, ditches, and canals, and a pump that pumps water from these pits, ditches, and canals to a reservoir. The large tail-water pits, ditches, canals, and reservoirs are used because the volume and duration of tail-water is variable and unpredictable, and because large tail-water pits, ditches, canals, and reservoirs may also be used to collect rain water runoff as an additional water source.

However, conventional tail-water recovery systems (TWRS) suffer from significant drawbacks. For example, Arkansas soils seal considerably, and tail-water ratios (i.e., the percentages of leftover tail-water at the lower elevation of the field as compared to the total amount of water that was initially pumped onto the field) can be high for furrow irrigation systems. Thus, using conventional tail-water recovery methods requires significant numbers of large tail-water pits, ditches, canals and reservoirs in the fields. These pits, ditches, and canals store the tail-water for a later time when the water can be pumped back into the irrigation system or placed back in existing reservoirs, and the reservoirs store water for long periods of time. Generally, tail-water recovery systems capture water during the winter wet season and during irrigation season for the irrigation system. The amount of tail-water from furrow irrigation systems is highly variable and unpredictable, and varies by soil type, slope, soil sealing effects, compaction, recent history of rainfall and irrigation, and between one field and the next. Tail-water ratios can be very different between irrigation events in the same field during a season. Besides the high upfront cost to create large pits, ditches, canals, and reservoirs to implement TWRS, the continuous use of such structures results in an overall reduction in available land for growing crops, thereby significantly reducing profit potential and increasing maintenance costs associated with wind and water erosion and sedimentation.

Additionally, conventional TWRS are often unattended, resulting in undesired consequences. For example, if a tail-water pit water level is low, the pump will lose suction and cavitate, causing considerable pump damage. On the other hand, overflow may occur following heavy rainfall, creating environmental concerns when stored water containing agricultural chemicals and nutrients enters public water systems.

Additionally, the location of a tail-water pump in a conventional TWRS is often not near grid power, so engines are used as a power source for the pump. Frequently, these engines are diesel-fueled internal combustion engines, which are expensive to operate and require ongoing attention to maintain fuel levels.

Besides significant investment to create large tail-water pits for TWRS, there are a number of ongoing issues. Management of a tail-water pit requires ongoing oversight for a) monitoring when the pit is nearing empty; b) control of aquatic weed growth; c) control and/or repair of slope erosion; d) control of mosquitos; and e) necessity of removal of silt, sediment and trash at intervals. Furthermore, land is taken out of production to build tail-water pits and associated ditches. Finally, long-term storage of tail-water can lead to deep penetration of agricultural chemicals resulting in groundwater pollution.

To be useful, water from tail-water pits must ultimately be returned to the irrigation system, and thence to the field. Energy is required to power pump motors to return the water, and such expenditure is difficult to justify given current state-of-the-art irrigation systems. Both to minimize area lost to create tail-water pits and to minimize growth of weeds, pits must be at least 1 meter deep and preferably depth is 9 meters or more. Therefore, return pumps must provide at least 3 meters of suction lift.

The horsepower of the motor attached to the pump must be sized to provide the lift from the deepest portion of the pit to the top of the field, as well as to overcome the loss of head due to friction in a transfer piping and to then provide the necessary pressure to distribute the water laterally to each furrow. For example, with a transfer piping run of 300 meters in length and a 20 cm pipe diameter, a minimum 11 kW pump might be required to output at 6 meters of head at the rate of 40 Liters per second.

The energy cost to operate a pump motor is proportional to horsepower, but otherwise varies widely depending on circumstances. For example, many farmers prefer to discharge from the tail-water pit during daytime using electrically operated pumps, thereby invoking peak rates. Others choose to install diesel engines, which are less energy efficient, and require fuel replenishment at intervals. However, in any scenario the energy cost to operate such TWRS is significant. There is a need to minimize both energy and labor costs.

The economics of TWRS have long limited adoption. Water is initially pumped to fields either from surface sources such as reservoirs, lakes, or rivers, or from groundwater wells that draw from subterranean aquifers. Regardless of the source, the cost of the water is dominated by the cost of the capital equipment, mainly pumps and pipes, and the energy to power the pumps. The cost of water varies widely around the U.S., between roughly $0.05 and $0.18 per 1,000 gallons delivered to the central distribution point on the field. The capital equipment costs depend primarily on the pump horsepower (HP) and the length of the pipe. For example, in 2017 the price of a pump can be approximated as a baseline of $1,500 plus $500 per HP. The pump HP in turn depends on the "lift" required to bring water from its starting elevation to the distribution point on the field, and the length of the pipe. Friction in the pipe and suction lifts contribute to significant total dynamic head requirements, and added HP is required to overcome these losses. Although a broader society might recognize additional costs, the individual farmer is motivated to invest in TWRS when the cost to recover the water is less than or equal to the cost of simply providing more water from the source. In most cases the systems are not very efficient because designs are based on providing the full irrigation capacity for the field and ease of operation. Thus there are economic gains in TWRS that can be gained from reducing energy use, improving capture and reuse, and lowering capital costs.

Approaches to capture and re-use rainfall are complicated by the fact that large quantities of water may fall in a short time period. While storing the water for later re-use seems an attractive approach, this typically involves making opportunistic use of existing streams, ponds and reservoirs. It is very expensive to create structures to store all of the runoff due to rainfall on a farm, and this requires large land areas that could be used to produce crops and profit. On the other hand, a cost-effective system capable of capturing a portion of runoff due to rainfall and returning it to the field would reduce the demand for pumping groundwater or surface water for irrigation.

Farmers collect data and information from various sources to assist in making irrigation decisions. Data is often incomplete and requires judgment on how to best use the information to minimize crop stress and to maximum yields. For example, while it is simple to measure the amount of rainfall, the degree of absorption of the water depends on the antecedent moisture content of the soil and its water holding capacity, often a function of soil texture, bulk density and organic matter. There is an ongoing need for improved information relating to actual absorption of rain fall, since this is one key variable in decision-making on need for irrigation. Further, automated decision-making is an ultimate goal, and all steps to improve on amount and quality of information are valuable in support of this goal. In particular, there is a need to close the loop on water application to the farm by measuring both inputs and outputs.

Additionally, underground polyvinyl chloride (PVC) irrigation pipe is very expensive but can withstand relatively high pressures (50-200 psi), whereas the use of 10 mil thick poly ethylene (PE) lay-flat irrigation pipe, for example, is very low cost but may burst at pressures as low as 5 feet of head (2.17 psi). One key to enabling use of low-cost lay-flat pipe is to supply water without exceeding the burst pressure, even when surging during startup or when flow is abruptly halted. Furthermore, PVC material is inexpensive, but also light weight and non-susceptible to degradation by corrosion. With such characteristics, it would be advantageous to make use of PVC material in as many components as possible in an irrigation system.

SUMMARY

A first embodiment includes a gravity irrigation system, wherein tail-water as runoff is guided by the use of drain furrows to a sump and an intake structure located at a lowest elevation of a field, and thence is pumped to a highest elevation of the field, where the water is distributed. In accordance with the first embodiment, the gravity irrigation system includes a supply pump and a transfer piping to deliver water to an elevated portion of the field or crown, a pressure-reducing valve to reduce the pressure of water being delivered to irrigation pipes, drain blocking mechanisms, and distribution piping including apertures to distribute supplied water to an agricultural field. The system further includes a sump to receive tail-water as runoff at the lowest elevation of a field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. By way of examples, the pressure-reducing valve may be a flapper valve, gate valve or butterfly valve.

In an example case in accordance with the first embodiment the flow rate of irrigation water from the supply pump to the elevated portion (top) of the field is 6.8 cubic meters per minute (1800 gallons per minute). With a 5 cm of depth irrigation set, water will be supplied to a 15 hectare field over a 20 hour time period. Perhaps one-third of the supplied water will eventually appear at the location of the sump. Tail-water will appear as runoff beginning at a slow rate within about 2-30 hours following initiation of irrigation, and continuing until recession occurs about 1-10 hours after cutoff. Therefore, the maximum required output rate of the return pump to dynamically capture and return all of the recovered tail-water is about one-third of the supply flow rate, or 2.3 cubic meters per minute (600 gallons per minute (GPM)) for this example. A variable frequency drive for a pump motor is used both to prevent pump cavitation and to maintain low head. When the depth sensor indicates that there is little or no water in the sump, the variable frequency drive automatically cuts off power to the motor. When the depth sensor indicates low water level in the sump, the variable frequency drive will operate the motor at reduced speed, thereby preventing cavitation, maintaining low head and conserving energy. When the sump is close to being full and tail-water is arriving rapidly, the variable frequency drive will operate the motor at maximum speed. Roughly one-third of the tail-water that is returned to the top of the field will again arrive at the sump and be returned a second time. This will occur iteratively until the flow rate of tail-water arriving at the sump is minimal. Following the third iteration, about 98% of the water initially delivered by the supply pump will have been retained on the field. The horsepower of the return pump motor is sized appropriately to provide sufficient flow rate to dynamically capture runoff from an irrigation set while conserving energy by minimizing head.

In a second example of the first embodiment, assume that a 1 inch rainfall occurs evenly over a two hour period. Rainwater falling on a 40 acre field is equivalent to a 40 acre-inch (1,080,000 gallons) supply. Assuming that one-third of the rain falling over the 40 acre field arrives at the sump as tail-water over a 10 hour period, the equivalent flow rate to the sump is 600 GPM. If the return pump is specified to pump (output) 600 GPM, all of the tail-water from the rainfall might be captured and returned to the field. However, due to uneven flow rates over time, perhaps only half of the tail-water can actually be returned to the field, with the remainder allowed to escape from the target field. Furthermore, for more rapid and/or prolonged rainfall, perhaps only 10-20 percent of the tail-water can be captured and returned to the field.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to an agricultural field. The system further includes a sump to receive tail-water as runoff at the lowest elevation of the field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The return pump operates against a very low lift requirement, and negligible friction loss in transfer piping, while producing a high flow due to its efficient pump design and high motor and variable frequency drive efficiencies. Thus the return pump is considerably smaller and lower cost than a traditional ditch-style tail-water return pump. It only pumps water when water is present, at the flow rate that is needed, and at optimum speeds, greatly reducing the operational cost to return the water to the crown of the field.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to an agricultural field. The system further includes a sump to receive tail-water as runoff at the lowest elevation of a field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the feedback of the depth sensor in the sump. A transfer piping coupled to the outlet of the return pump brings tail-water from the return pump to a backflow-preventing check valve, and thence to a connection to the transfer piping at a point downstream of the pressure-reducing valve. Although not necessary for proper function, the system optionally incorporates meters at the tail-water pump and the irrigation source to measure water applied to the field.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to an agricultural field. The system further includes a sump to receive tail-water as runoff at a lowest elevation of a field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The pressure-reducing valve is a valve having an actuator that is driven by an electric motor.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at the lowest elevation of the field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The pressure-reducing valve is a valve having an actuator that is driven by an electric motor. The power source for the electric motor is a battery, and the battery is charged by an attached solar panel.

In accordance with another embodiment, a gravity irrigation system includes a supply pump and a transfer piping to deliver water to an elevated portion of a field, a pressure-reducing valve to reduce the pressure of water being delivered to the lay flat irrigation pipes, and distribution piping including apertures to distribute supplied water to the field. The system further includes a sump to receive tail-water as runoff at the lowest elevation of a field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The pressure-reducing valve is a valve having an actuator that is driven by an electric motor. The power source for the electric motor is a battery, and the battery is charged by an attached solar panel.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of a field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The pressure-reducing valve is a valve having an actuator that is driven by an electric motor. The power source for the electric motor is a battery, and the battery is charged by an attached solar panel. The pressure-reducing valve is set in a first position to reduce the head from the transfer piping to a maximum of 5 feet when the return pump is not operating, and in a second position that varies in response to a sensed pressure in the distribution piping to maintain the head at a maximum of 5 feet when the return pump is operating.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of a field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. Connected to the transfer piping is an overpressure relief element that simply returns water to the sump when the pressure is excessive. Water returned to the sump may again be pumped to the elevated portion of the field.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at the lowest elevation of a field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The distribution piping including apertures are of the type known as lay-flat polyethylene pipe, having a thickness of 12 mils or less.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of the field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The distribution piping including apertures are of the type known as lay-flat polyethylene pipe, having a thickness of 12 mils or less. The apertures in the pipe are aligned with furrows in the field, with one aperture per furrow. Aperture diameters are customized, or custom-sized, to approximate uniform flow rate of water from every aperture, such that each furrow receives the same amount of water per unit time.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to an agricultural field. The system further includes a sump to receive tail-water as runoff at a lowest elevation of a field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The power source connected to the variable frequency drive is an electrical wire that is connected to an electrical grid.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of the field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The power source connected to the variable frequency drive is an electrical wire that is connected to the output of an electrical generator powered by an internal combustion engine.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of a field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The power source connected to the variable frequency drive is an electrical wire that is connected to the output of a solar photovoltaic array.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at the lowest elevation of a field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. A support structure built atop and attached to the sump supports the return pump, the attached motor, and the variable frequency drive.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of the field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. A support structure built atop and attached to the sump supports the return pump, the attached motor, and the variable frequency drive. An overall footprint of the sump, return pump, attached motor, and an optional pump panel is less than 900 square feet.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of the field, a return pump disposed at least partially within the sump to move tail-water to an elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The return pump includes a body fabricated from polyvinyl chloride pipe.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to an agricultural field. The system further includes a sump to receive tail-water as runoff at a lowest elevation of the field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The return pump includes a body fabricated from polyvinyl chloride pipe. The return pump further includes a discharge element, first transition element, and second transition element each fabricated from polyvinyl chloride.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of the field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The gravity irrigation system further includes a processor with memory that collects and time stamps information collected from one or more sensors.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of a field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The gravity irrigation system further includes a processor with a memory that collects and time stamps information collected from one or more sensors. The gravity irrigation system further includes a remote communication subsystem capable of transmitting collected information to another location.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of the field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The gravity irrigation system further includes a processor with a memory that collects and time stamps information collected from one or more sensors. The gravity irrigation system further includes a remote communication subsystem of the type known as Wireless Fidelity.

In accordance with another embodiment, a gravity irrigation system includes a supply pump and a transfer piping to deliver water to an elevated portion of a field, a pressure-reducing valve to reduce the pressure of water being delivered to irrigation pipes, and distribution piping including apertures to distribute supplied water to the field. The system further includes a sump to receive tail-water as runoff at a lowest elevation of the field, a return pump disposed at least partially within the sump to move tail-water to the elevated portion of the field, a depth sensor disposed within the sump, and an attached motor to drive the return pump. A power source is connected to a variable frequency drive, which in turn powers the motor and controls the motor speed proportionately to the indication of the depth sensor in the sump. A transfer piping coupled to the outlet of the return pump brings tail-water from the return pump to a backflow-preventing check valve, and thence to a connection to the transfer piping at a point downstream of the pressure-reducing valve. The gravity irrigation system further includes a processor with a memory that collects and time stamps information collected from one or more sensors. The sensors include various combinations of flow sensors disposed in the transfer piping and the transfer piping and moisture sensors distributed throughout the field.

In accordance with another embodiment, a gravity irrigation system includes a distribution piping having apertures to distribute water to a field, and a valve located upstream of the distribution piping. The valve is configured to limit a pressure of the water being delivered to the distribution piping. The system also includes a sump configured to receive the water at a lowest elevation of the field, a depth sensor disposed within the sump, and a return pump disposed at least partially within the sump and configured to move the water to an elevated portion of the field. The system also includes a motor configured to drive the return pump, and a power source coupled to a variable frequency drive. The variable frequency drive is configured to power the motor and control a motor speed proportionately to an indication of the depth sensor. The system also includes a transfer piping coupled to an outlet of the return pump to bring the water from the return pump to a check valve and from there to the distribution piping at a low pressure side of the valve.

In accordance with another embodiment, a gravity irrigation system includes a distribution piping having apertures to distribute supplied water to a field, and a valve located upstream of the distribution piping. The valve is configured to limit a pressure of water being delivered to the distribution piping. The system also includes a sump configured to receive water at a lowest elevation of the field, a depth sensor disposed within the sump, and a return pump disposed at least partially within the sump and configured to move the water to an elevated portion of the field. The system also includes a motor configured to drive the return pump, and a power source coupled to a variable frequency drive. The variable frequency drive is configured to power the motor and control a motor speed proportionately to an indication of the depth sensor. The system also includes a controller coupled to the valve with a memory that collects and time stamps information collected from one or more sensors.

Other aspects of the invention will become apparent by consideration of the detailed description and accompanying drawings.

It should be understood that the invention is not limited in its application to the details of embodiment and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Figure 1:
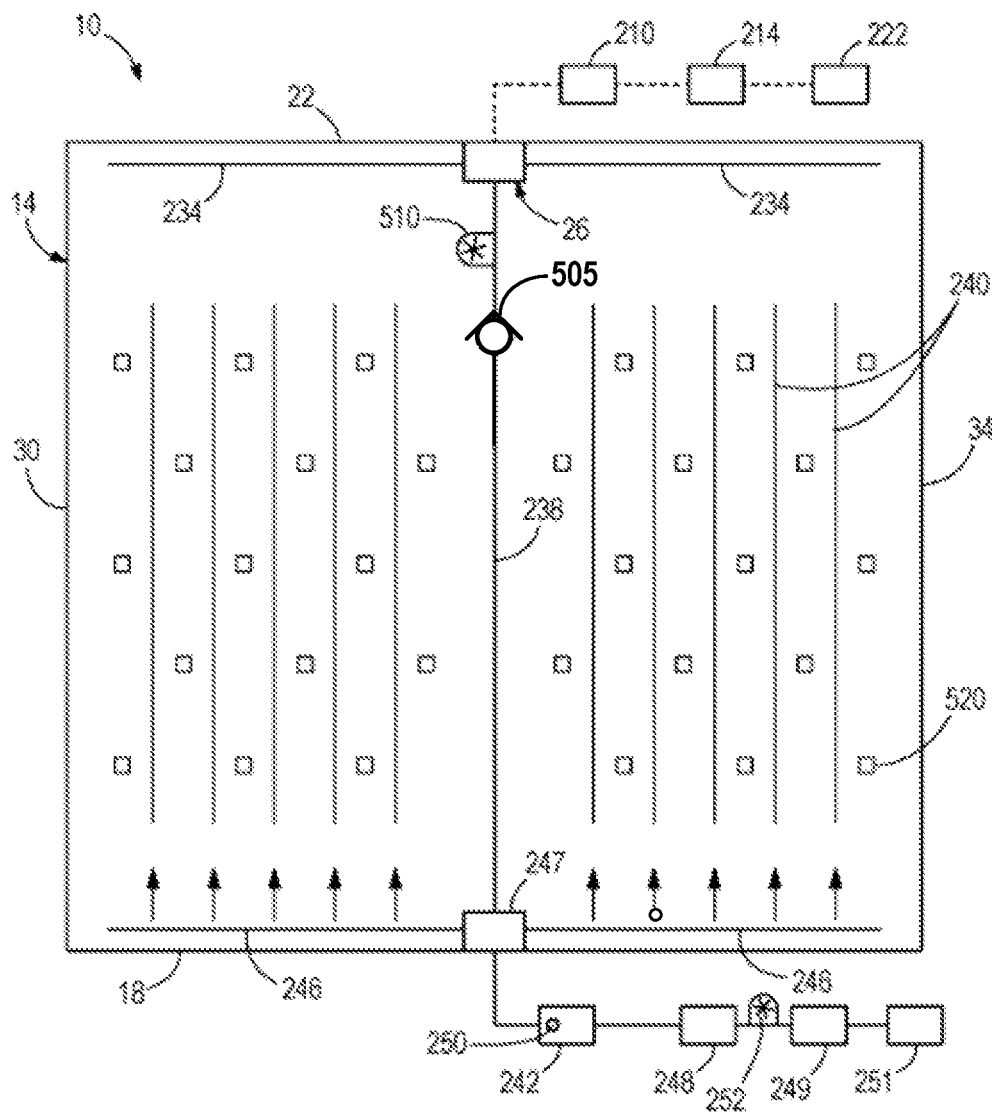
FIG. 1 is a plan view schematic illustration of an irrigation system deployed in a field in accordance with one embodiment.
Figure 2:
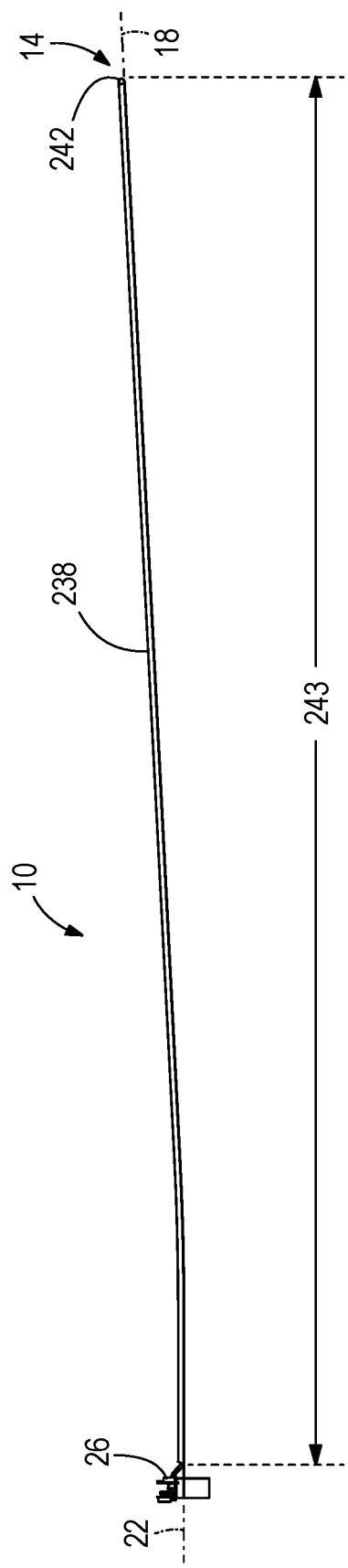
FIG. 2 is a schematic side view of the system.

FIGS. 1-12 illustrate a variable-flow tail-water return pump system 10 for use in irrigating an agricultural field 14. The agricultural field 14 may be any type of field for planting and growing a crop (e.g., rice, corn, cotton, wheat, grain, sorghum, etc.), and may have any size and shape. As illustrated in FIGS. 1 and 2, the agricultural field 14 includes a first (e.g., top) end 18, and a second (e.g., bottom) opposite end 22. The agricultural field 14 is sloped, as illustrated in FIG. 2, such that the first end 18 is positioned at a higher elevation than the second end 22. For example, in some embodiments the first end 18 is positioned between approximately 1-4 feet higher than the second end 22. In some embodiments the first end 18 is positioned approximately 2.5 feet higher than the second end 22. Other embodiments include different ranges and values. In some embodiments, the average slope of the agricultural field 14 results in a grade of between (and including) one-tenth of a foot per hundred linear feet (0.1'/100') and one-tenth of a foot per hundred linear feet (0.5'/100'). In some embodiments, the slope of the agricultural field 14 results in a grade that is approximately 0.2'/100'. Other embodiments include different ranges and values.

Figure 3:
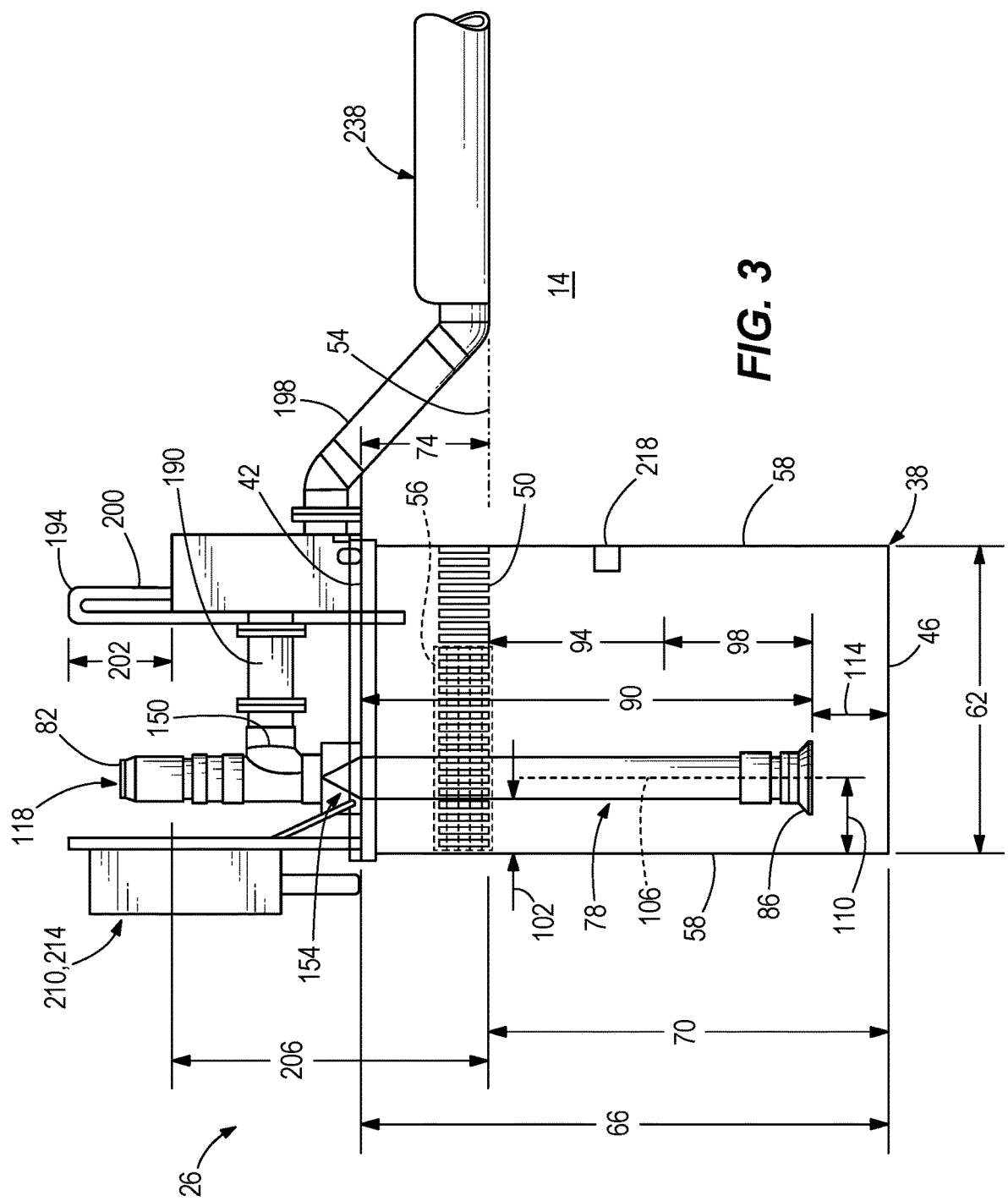
FIG. 3 is a schematic, side view of a return pump assembly of the system.

With reference to FIGS. 1-3, the system 10 includes a return pump 26. The return pump 26 is positioned generally at the second end 22 of the field 14, and generally in a center of the field 14 between a first side 30 and a second opposite side 34 of the field 14 (FIG. 1), although other embodiments include different locations for the return pump 26 than that illustrated. For example, in some embodiments the return pump 26 is positioned closer to the first side 30 or to the second side 34. In some embodiments the return pump 26 is positioned closer to the first end 18 than illustrated.

With reference to FIG. 3, the return pump 26 includes a sump 38 having a top end 42 (e.g., lid) and a bottom end 46 (e.g., floor). In some embodiments the sump is formed at least partially from polyvinyl chloride pipe. In some embodiments the top end 42 includes a hinged access door, and a ladder is affixed to the inside of the sump 38 (e.g. along a wall of the sump 38). In some embodiments the access door is approximately 2 feet by 2 feet to allow access to a sensor inside the sump 38 and to manually observe draw down in the sump 38. With continued reference to FIG. 3, the sump 38 includes a plurality of slots 50 spaced around the sump 38 between the top end 42 and the bottom end 46. The slots 50 are sized and shaped to receive tail-water and to direct the tail-water into the sump 38. For example, as illustrated in FIG. 3, the agricultural field 14 includes a top soil surface 54. The slots 50 are positioned adjacent the top soil surface 54, such that the tail-water flowing down the sloped agricultural field 14 flows into and through the slots 50 and down into the sump 38 toward the bottom end 46 of the sump 38. In the illustrated embodiment, the slots 50 are each one inch by 8 inches (1" by 8") and are spaced 1" apart from one another. The slots 50 are covered by a ½" 23 gauge hardware fabric cover or screen 56, a portion of which is illustrated schematically with dashed lines in FIG. 3. However, other embodiments include different sizes, shapes, and/or spacing for the slots 50, as well as different materials for the cover or screen 56 to cover the slots 50. In some embodiments, one or more of the slots 50 are not covered with a cover or screen 56. In some embodiments, the slots 50 are circular apertures having diameters between ¼" and 2" or other suitable sizes outside of this range.

In the illustrated embodiment, the sump 38 is cylindrical, and comprised of steel. The bottom end 46 is a ¼" steel plate that is spot welded to a side of the sump 38, and the top end 42 is a ¼" steel plate spot welded to the side 58. Other embodiments include different materials for the sump 38, as well as different shapes than that illustrated. In the illustrated embodiment, the sump 38 has an overall width or diameter 62 of approximately 48", although other embodiments include different overall widths or diameters 62, or different ranges of overall widths or diameters 62. For example, in some embodiments the overall width or diameter 62 is between (and including) 38" and 58". In the illustrated embodiment, the sump 38 has an overall height 66 (i.e., depth) of approximately 82", although other embodiments include different overall heights 66 or ranges of overall heights 66. For example, in some embodiments, the sump 38 has an overall height 66 between (and including) 72" and 92". In some embodiments the overall height 66 is as low as 24". The overall height 66 of the sump 38, as well as the overall width or diameter 62, may therefore vary. For example, in some embodiments the overall height 66 is shallower than that illustrated. In other embodiments the overall height 66 is deeper than that illustrated. In some embodiments, the overall width or diameter 62 is larger than that illustrated (e.g., to provide greater area for more slots 50 or for the cover or screen 56). In some embodiments, the overall width or diameter 62 is smaller than that illustrated. In some embodiments the sump 38 has a relatively larger overall height 66 but a smaller overall width or diameter 62. Conversely, in other embodiments the sump 38 has a relatively smaller overall height 66 but a larger overall width or diameter 62.

In the illustrated embodiment, a distance 70 between the slots 50 and the bottom end 46 of the sump 38 is approximately 62", although other embodiments include different distances 70 or ranges of distances 70. For example, in some embodiments, the distance 70 is between approximately 52" and 72". In the illustrated embodiment, a distance 74 between the slots 50 and the top end 42 of the sump 38 is approximately 20", although other embodiments include different distances 74 or ranges of distances 74. For example, in some embodiments, the distance 74 is between (and including) 10" and 30".

Figure 4:
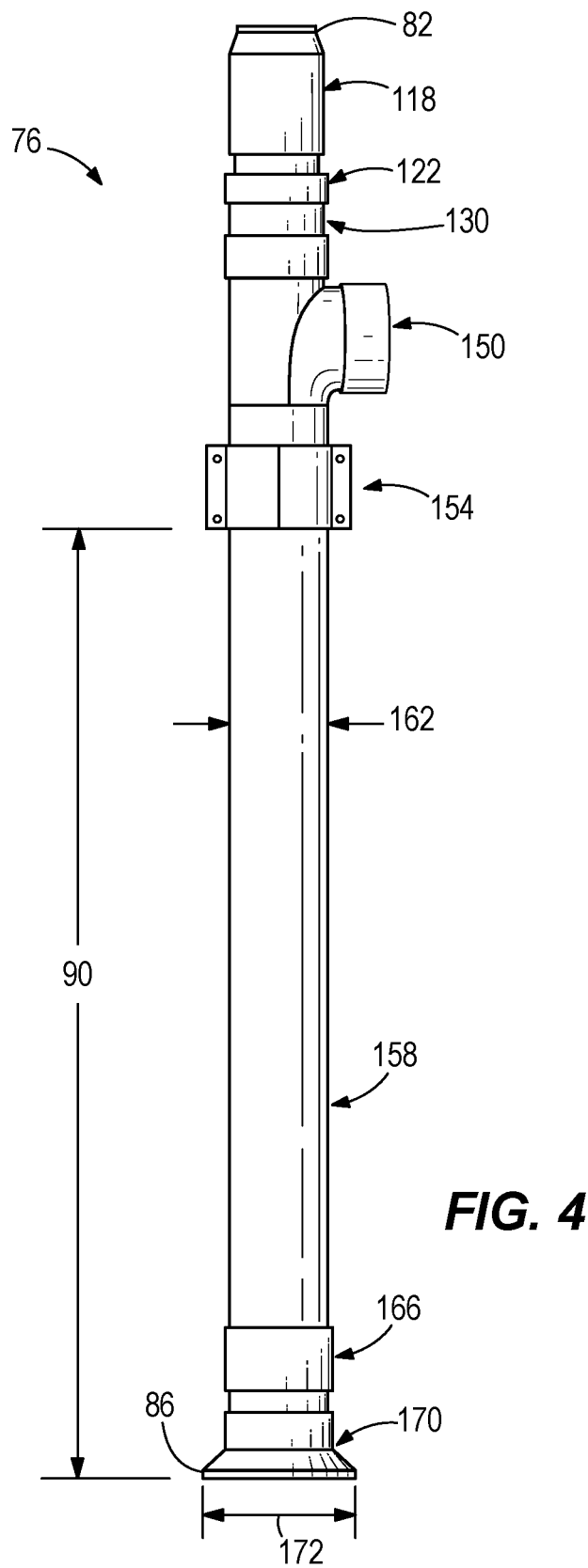
FIG. 4 is a schematic, side view of a pump of the return pump assembly.

With reference to FIGS. 3 and 4, the return pump 26 further includes a pump 78 positioned at least partially within the sump 38. In some embodiments the pump is formed at least partially of polyvinyl chloride pipe. The pump 78 includes a top end 82 and a bottom end 86. As illustrated in FIG. 3, the top end 82 extends out of the sump 38, and the bottom end 86 extends into the sump 38, such that a portion of the pump 78 extends a distance 90 into the sump 38. In the illustrated embodiment, the distance 90 is approximately 70", although other embodiments include different distances 90, or different ranges of distances 90. For example, in some embodiments, the distance 90 is between (and including) 60" and 80". In some embodiments, the pump 78 is a submersible pump. In some embodiments the return pump 26 has a maximum dynamic head of 5 feet while outputting at least 600 gallons per minute With reference to FIG. 3, the pump 78 is configured to extend down into the sump 38 at least to an operating distance 94 below the slots 50. In the illustrated embodiment, the pump 78 extends an added distance 98 past the operating distance 94. The operating distance 94 is approximately 29" and the added distance 98 is approximately 21", although other embodiments include different values and ranges of operating distances 94 and added distances 98. For example, in some embodiments the operating distance 94 is between (and including) 19" and 39". In some embodiments, the added distance 98 is between (and including) 0" and 31".

With continued reference to FIG. 3, the pump 78 is positioned off-center within the sump 38 by a distance 102 from one side 58 of the sump 38. In the illustrated embodiment, the distance 102 is approximately 9", although other embodiments include different distances 102 or ranges of distances 102. For example, in some embodiments, the distance 102 is between (and including) 7" and 11".

With continued reference to FIG. 3, a centerline 106 of the pump 78 is positioned off center within the sump 38 by a distance 110. In the illustrated embodiment, the distance 110 is approximately 12", although other embodiments include different distances 110 or ranges of distances 110. For example, in some embodiments, the distance 110 is between (and including) 9" and 15".

With continued reference to FIG. 3, the bottom end 86 of the pump 78 is positioned a distance 114 from the bottom end 46 of the sump 38. In the illustrated embodiment, the distance 114 is approximately 12", although other embodiments include different distances 114 or ranges of distances 114. For example, in some embodiments, the distance 114 is between (and including) 9" and 15".

Figure 5:
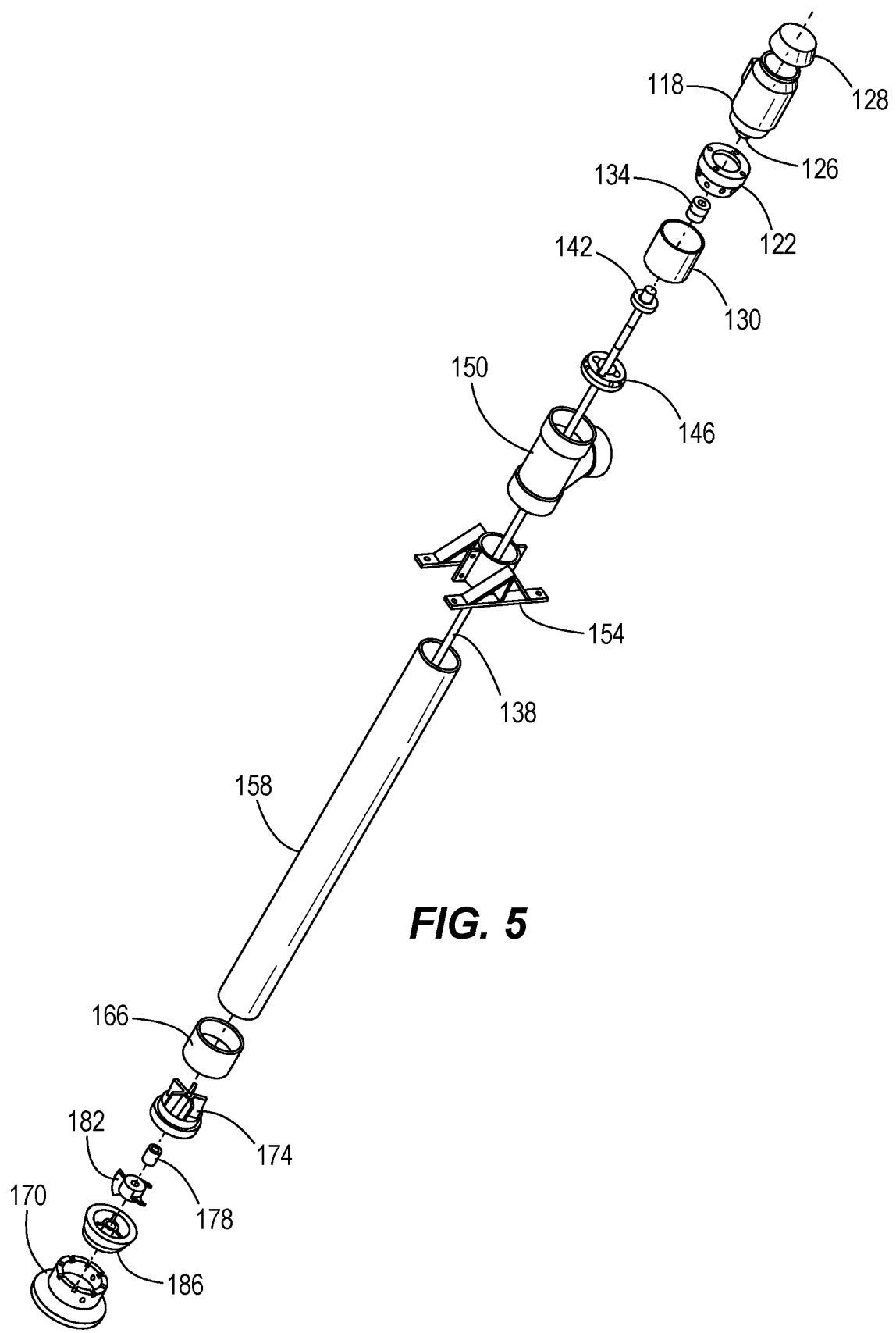
FIG. 5 is an exploded, perspective view of the return pump.

With reference to FIGS. 4 and 5, the pump 78 includes a motor 118 (e.g., a totally enclosed fan-cooled motor) at the top end 82 of the pump 78, and a motor mount 122 coupled to the motor 118. In the illustrated embodiment, the motor 118 is a 2-3 hp motor, with a shut off head of 9 ft., although other embodiments include different types of motors, as well as different locations for the motor 118 than that illustrated. The motor 118 includes an output element 126 (e.g., shaft) (FIG. 5). The motor 118 also includes a cover 128 (e.g., rain cap) that inhibits water from entering the motor 118.

With continued reference to FIGS. 4 and 5, the pump 78 includes a top adapter element 130 (e.g., PVC pipe) coupled to the motor mount 122, a motor-to-shaft coupler 134 (FIG. 5) coupled to the output element 126, and a drive shaft 138 (FIG. 5) coupled to the motor-to-shaft coupler 134. A top bearing 142 (FIG. 5) and a bearing plate 146 (FIG. 5) are both coupled to the drive shaft 138.

With continued reference to FIGS. 4 and 5, the pump 78 includes a discharge element (e.g., discharge head) 150 coupled to both the top adapter element 130 and to a mounting clamp 154 (e.g., stainless steel bracket). The discharge element 150 helps to support the motor 118, and to support a housing (e.g., the bearing plate 146) of the top bearing 142. In some embodiments the top bearing 142 is sealed by a spring and washer that maintain compression on a sealed surface to keep water out of a thrust bearing 178. In some embodiments, water-resistant bearing grease is used to lubricate the top bearing 142 along a motor side of the top bearing 142. In the illustrated embodiment, the discharge element 150 is a PVC elbow joint, although other embodiments include different shapes and sizes for a discharge element 150, as well as different types of material. With reference to FIG. 3, in the illustrated embodiment, the mounting clamp 154 is used to support the pump 78 on top of the top end 42 (e.g., lid) of the sump 38.

With continued reference to FIGS. 4 and 5, the pump 78 includes a body 158 that extends through the mounting clamp 154 and is coupled to the discharge element 150. In the illustrated embodiment, the body 158 is a PVC pipe, although other embodiments include different materials, as well as different shapes and sizes than that illustrated. In the illustrated embodiment, the mounting clamp 154 is a metal structure specifically sized and shaped to support a non-metallic (e.g., PVC) pipe. As illustrated in FIG. 4, the elongate body 158 has a width or diameter 162. In the illustrated embodiment, the width or diameter 162 is 6.625", although other embodiments include different values and ranges. For example, in some embodiments, the width or diameter 162 is between (and including) 5" and 9".

With continued reference to FIGS. 4 and 5, the pump 78 includes a bottom adapter 166 coupled to the body 158, and an intake element 170 (e.g., bowl) coupled to the bottom adapter 166. The intake element 170 has a width or diameter 172. In the illustrated embodiment, the width or diameter 172 is 11.38" although other embodiments include different values or ranges. For example, in some embodiments, the width or diameter 172 is between (and including) 10" and 13".

With reference to FIG. 5, the pump 78 also includes a recuperator 174, the thrust bearing 178, an impeller 182 (e.g., stainless steel), and a crown 186. The drive shaft 138 extends generally from the motor 118 through the discharge element 150, and through the body 158. The drive shaft 138 extends through the recuperator 174 and the thrust bearing 178, and is coupled to the impeller 182 and crown 186 so as to drive the impeller 182 upon activation of the motor 118.

With reference to FIG. 3, driving the impeller 182 causes tail-water in the bottom of the sump 38 to be pulled up through the intake element 170 and into the body 158. The tailwater is then pushed out through the discharge element 150.

With continued reference to FIG. 3, the return pump 26 also includes a first transition element 190 (e.g., PVC pipe) coupled to the discharge element 150, a pressure relief element 194 (e.g., valve) coupled to the first transition element 190, and a second transition element 198 (e.g., PVC pipe) coupled to the pressure relief element 194. When the pump 78 pumps tail-water out of the sump 38, the tail-water passes out of the discharge element 150, through the first transition element 190, and into the second transition element 198. If the pressure within the first or second transition elements 190, 198 is too high (exceeds a set point), the pressure relief element 194 allows some of the tail-water to be re-directed back into the sump 38. In some embodiments, the pressure relief element 194 may be adjusted (e.g., with a PVC pipe that is adjustable via threads) so as to adjust an amount of available pressure relief as desired. As illustrated in FIG. 4, the pressure relief element 194 in the illustrated embodiment includes a pipe 200 that loops vertically a distance 202. In the illustrated embodiment, the distance 202 is 16", although other embodiments include different values and ranges. For example, in some embodiments, the distance 202 is between (and including) 12" and 20". As illustrated in FIG. 4, a bottom of the looping portion of the pipe 200 is spaced a distance 206 from a bottom of the slots 50. In the illustrated embodiment, the distance 206 is 49", although other embodiments include different value and ranges. For example, in some embodiments, the distance 206 is between (and including) 39" and 59".

With reference to FIGS. 2 and 3, in some embodiments, the pressure relief element 194 may extend vertically to an overall elevation (as measured in the field 14) that is higher than the elevation of the first end 18. In some embodiments, the pressure relief element 194 extends vertically approximately 4.5', although other embodiments include different elevations and ranges of elevations. For example, in some embodiments, the elevation is between (and including) 3.5' and 7.5'.

The return pump 26 overall has a very small footprint in the field 14. For example, in some embodiments, the return pump 26 requires less than 7 square feet of space within the field 14, although other embodiments include different values and ranges. For example, in some embodiments, the return pump 26 requires less than 10 square feet, or less than 20 square feet of space. This small footprint advantageously allows the remaining area of the field 14 to be used for crop growth and for other purposes as desired. Additionally, in some embodiments, the return pump 26 produces a total dynamic head (TDH) of 5 ft. at 500 gallons per minute, and has a pump efficiency of at least 70%.

With reference to FIGS. 1 and 3, the system 10 includes a variable frequency drive 210 coupled to the return pump 26 and to the motor 118. The variable frequency drive 210 controls motor speed and torque for the motor 118, and accommodates varying rates of inflow of tail-water into the sump 38 based on feedback from a depth sensor (e.g., depth sensor 218 described below).

With continued reference to FIGS. 1 and 3, in the illustrated embodiment the system 10 also includes a pump panel 214 that is coupled to the variable frequency drive 210. Other embodiments do not include the pump panel 214. The pump panel 214 includes a controller (e.g., programmable logic controller (PLC)) that controls (e.g., autonomously with a proportional integral derivative (PID) loop) the variable frequency drive 210 and the amount of tail-water that is being pumped. As illustrated in FIG. 3, in some embodiments, the return pump 26 includes at least one depth sensor 218 (illustrated schematically) that measures a depth of the tail-water sitting in the bottom of the sump 38. In some embodiments, the depth sensor 218 includes an "air line" style that uses a pressure transducer and a resistive tape. The air line sensor includes a pipe that creates an air lock with the tail-water level. As a depth of the tail-water decreases, a pressure inside the pipe decreases, and as the depth of the tail-water increases, the pressure inside the pipe increases. The pressure is sensed with a pressure transducer. In some embodiments the depth sensor 218 is a pressure transducer that senses air pressure captured in a pipe being provided by the depth of the water in the sump 38. As depth increases in the sump 38, the pressure also increases correspondingly. The signal is calibrated in the controller to a known depth. In some embodiments, the depth sensor 218 includes a resistive tape (resistance increasing with depth) that senses a tail-water level, and the signal is calibrated in the controller. Other embodiments include different types of depth sensors 218 (e.g., floats, etc.). In some embodiments the variable frequency drive 210 and the PLC in the pump panel 214 include a bank of resistors, around 4 megaohms. In some embodiments up to 8 megaohms are provided. In other embodiments 2 megaohms are provided. Other embodiments include different amounts of ohms provided by the bank of resistors. The bank of resistors is connected to a braking transistor, where both the bank of resistors and the breaking transistor may reduce the voltage from a solar array (e.g., including one or more solar panels 226 as described below) so that the variable frequency drive 210 can operate when the pump 78 is initializing. In some embodiments the variable frequency drive 210 is equipped to accept direct current (DC) from a solar array directly to a DC bus. In some embodiments the pump panel 214 includes a controller with logic to manage solar power voltage and water level, dissipate overvoltage through a bank of resistors and braking transistor. In some embodiments the pump panel 21 includes control logic that manages high and low solar DC voltage so that the variable frequency drive 210 can operate the motor 118.

In some embodiments, an overall footprint of the sump 38, the return pump 26, and the pump panel 214 is less than 900 square feet.

In some embodiments, the controller receives a signal from the depth sensor 218, and based on that signal the controller changes the variable frequency drive 210 to either slow the speed of the motor 118 or increase the speed of the motor 118 (e.g., such that the rate at which the pump 78 is pumping the tail-water depends on the amount of tail-water that is being sensed inside the sump 38).

With continued reference to FIGS. 1 and 3, in some embodiments the variable frequency drive 210 and/or the pump panel 214 are positioned adjacent the top 82 of the pump 78 (FIG. 3). In other embodiments, the variable frequency drive 210 and/or the pump panel 214 are spaced from the pump 78 (e.g., closer to one of the sides 30, 34 of the field 14).

Figure 7:
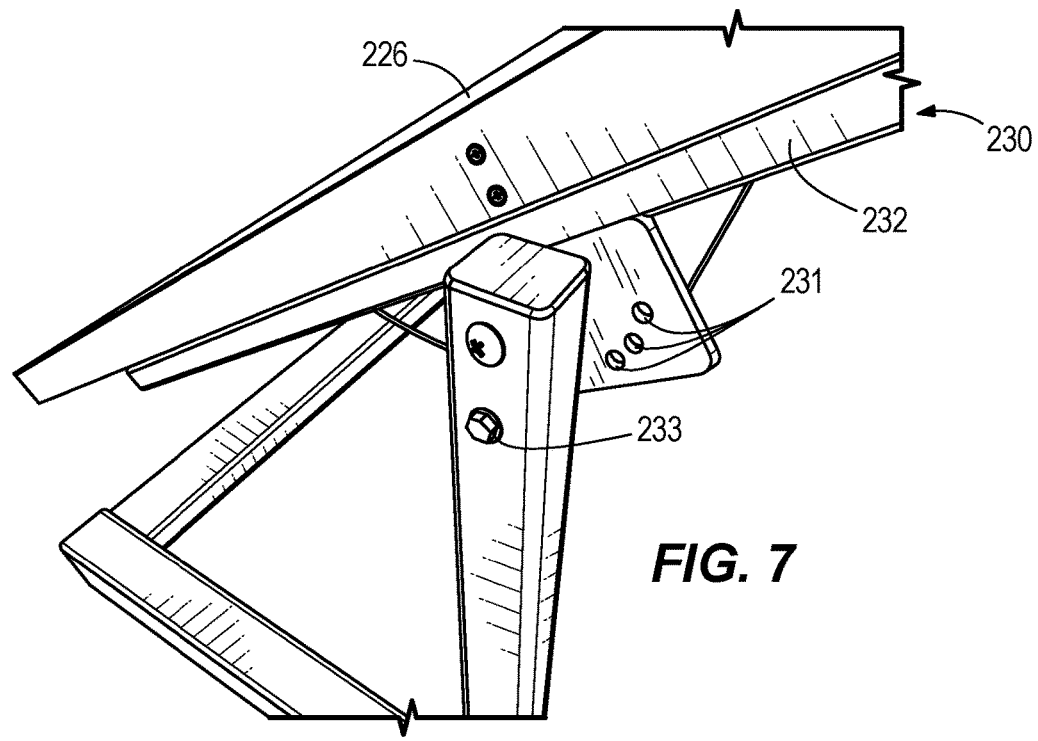
FIGS. 7 and 8 are partial perspective views of the solar cell framing assembly.
Figure 8:
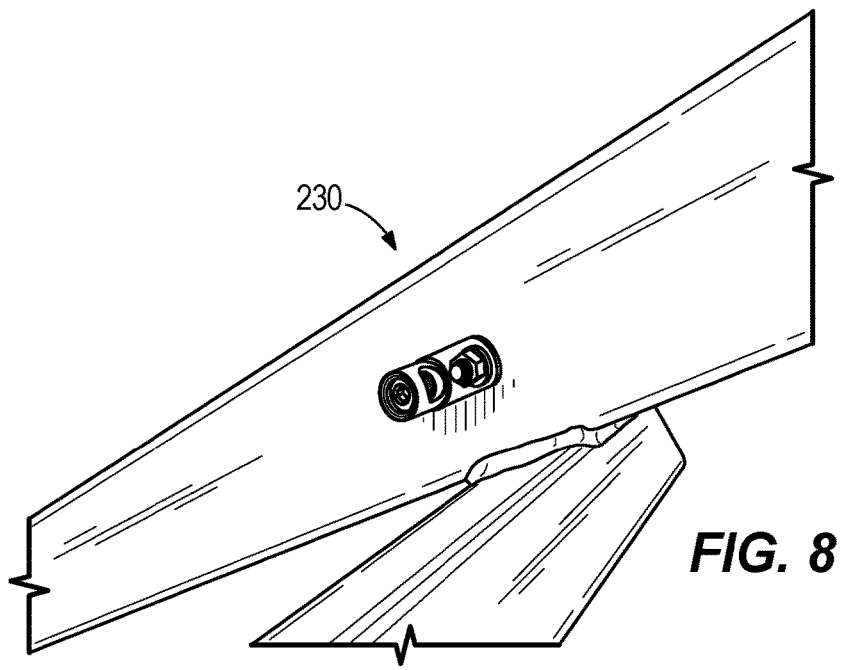
Figure 9:
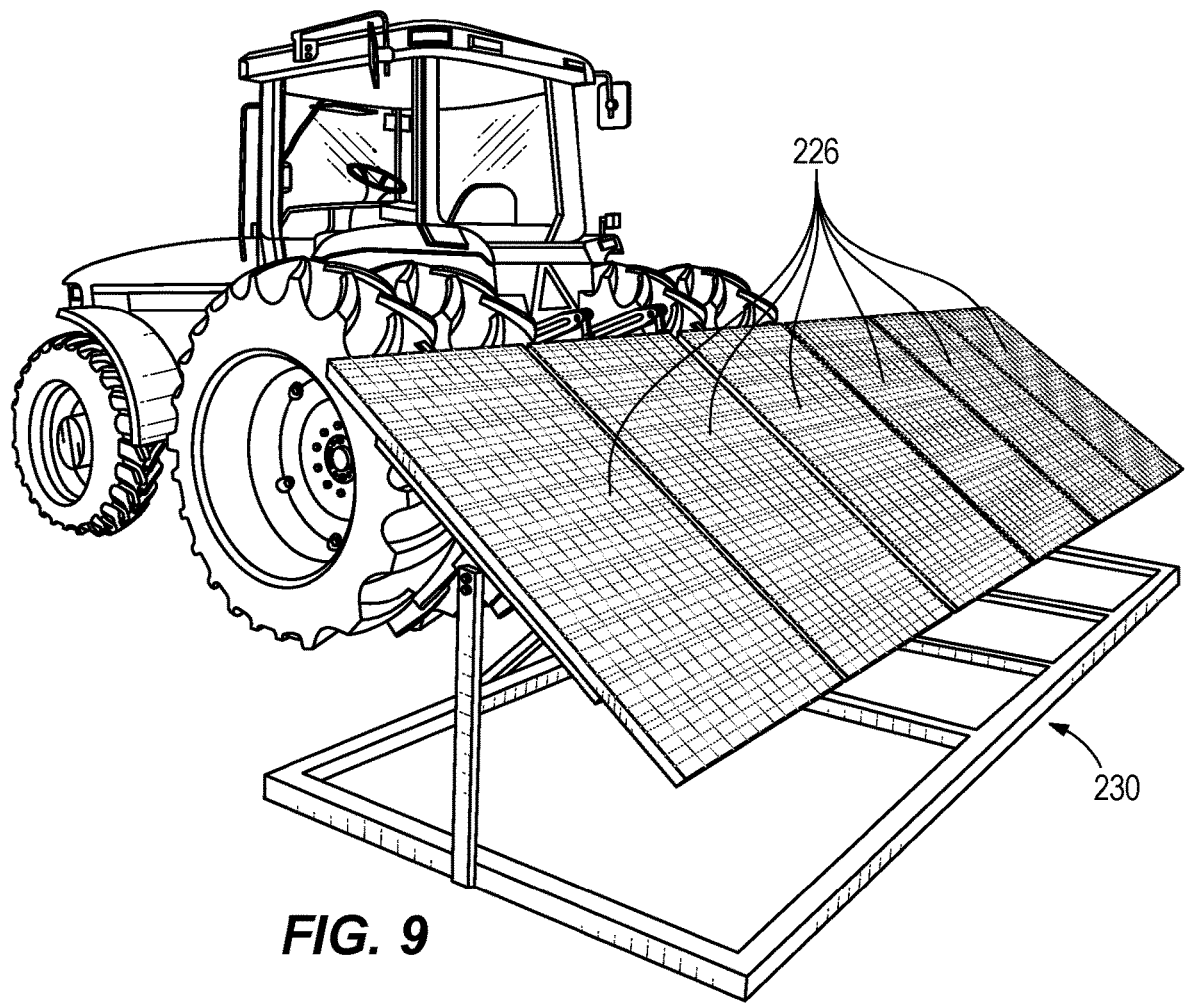
FIGS. 9 and 10 are perspective views of the solar cell framing assembly, with solar cells coupled to the solar cell framing assembly.
Figure 10:
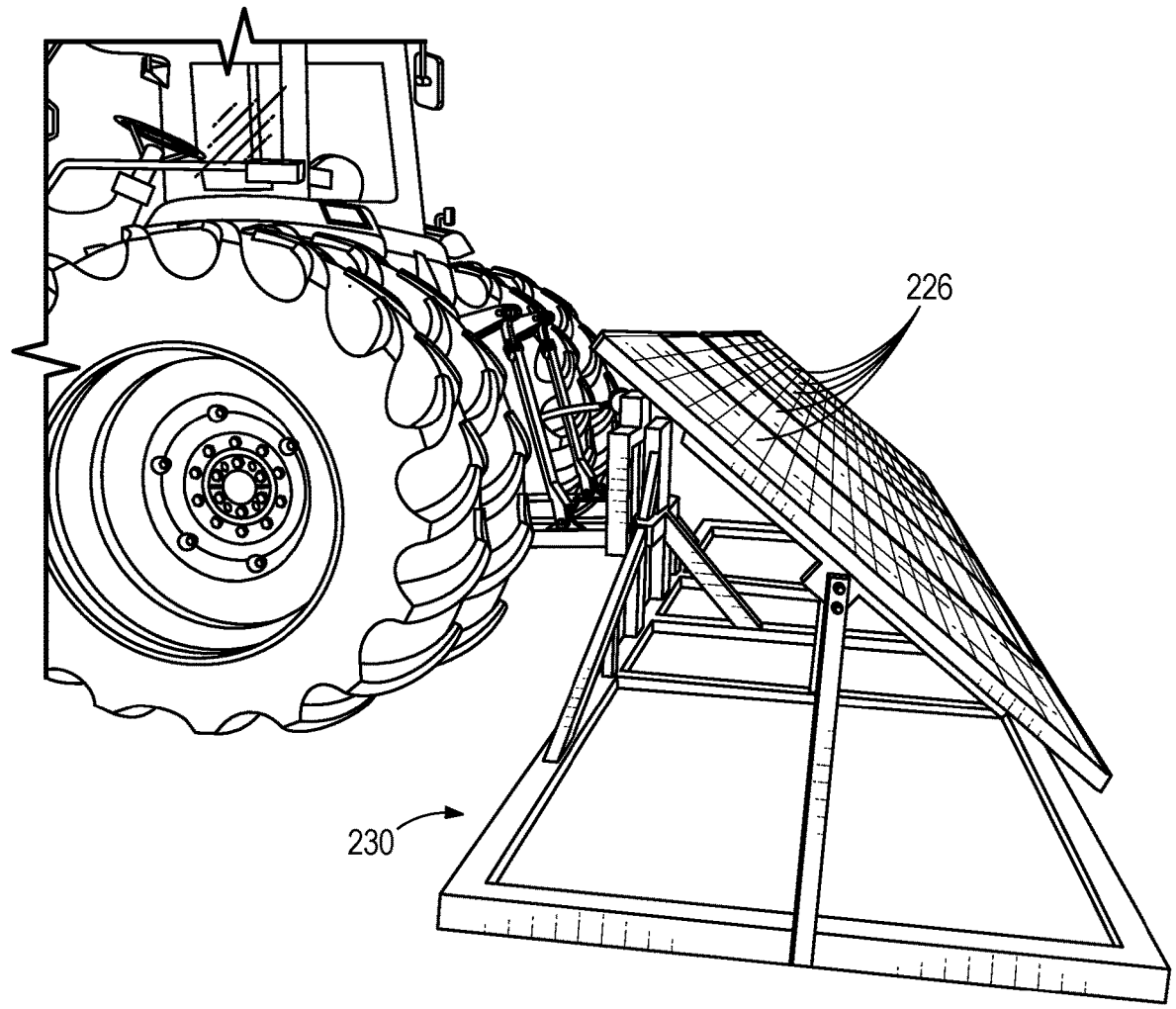

With reference to FIG. 1, the system 10 includes a power source 222 coupled to the pump panel 214 that powers the pump panel 214. In the illustrated embodiment, the power source 222 includes a solar array having at least six solar panels 226 (FIGS. 7, 9, 10). The solar panels 226 are near 3 kW in total capacity generating over 300 volts, although other embodiments include different numbers of solar panels 226 that result in the same nominal voltage. In some embodiments, the power source 222 does not include solar panels 226. For example, in some embodiments, the power source 222 is a wire coupled to a generator (e.g., internal combustion engine), a DC motor, or a wire coupled to an electrical grid (e.g., connected to a power station). In some embodiments, the power source 222 is a combination of both solar panels 226 and another power source (e.g., grid power). In the illustrated embodiment, the variable frequency drive 210 is specially adapted to use solar power when solar power is desired, and to use grid power when grid power is desired. In some embodiments, the power source coupled to the variable frequency drive 210 is a wire coupled alternately to an electrical grid or the output of a solar photovoltaic array.

With reference to FIGS. 6-10, the solar panels 226 are easily moved and transported from one location of the field 14 to another location (e.g., a servicing area), or from one field 14 to another field, with a frame 230 or other structure. In the illustrated embodiment, the frame 230 is a steel frame that holds at least one solar panel 226 (e.g., three solar panels 226), and includes a three-point hitch so that the frame 230 may be removably coupled to a tractor to move the frame 230. In some embodiments the frame 230 uses category 3 or 4 hitch dimensions to prevent theft of the structure. Other embodiments include aluminum frames or other materials.

Figure 6:
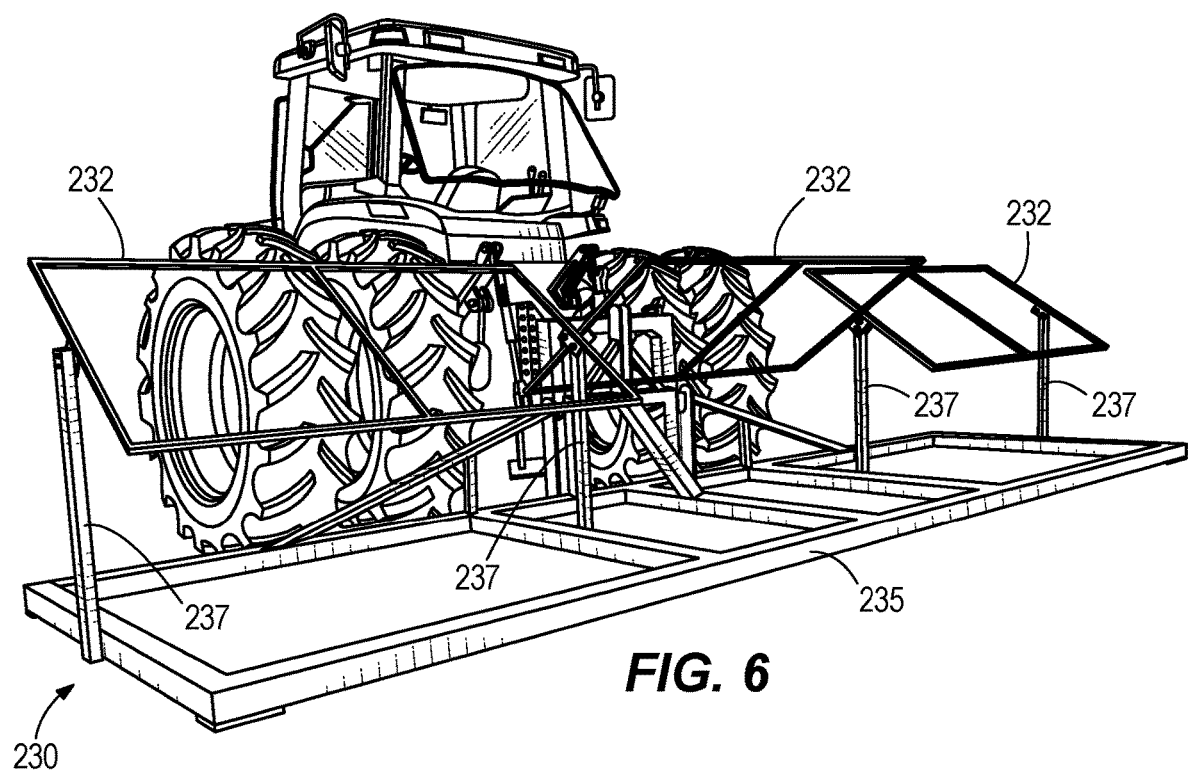
FIG. 6 is a perspective view of a solar cell framing assembly of the system, coupled to a tractor.

The solar panels 226 may be moved to another site to allow the solar panels 226 to be connected to a solar power inverter when grid electricity generation is desired. In some embodiments the solar panels 226 are rotatable or otherwise movable on the frame 230, or a portion or portions of the frame 230 are rotatable or movable, to adjust orientations of the solar panels 226. For example, FIG. 7 illustrates a plurality of apertures 231 on a rotating portion 232 of the frame 230, and a bolt 233 that may be selectively passed into one of the apertures 231 to lock an orientation of the frame 230 and the illustrated solar panel 226. FIG. 6 illustrates three of the rotating portions 232, two of the rotating portions 232 being angled in a first direction, and the third rotating portion 232 being angled in a second, different direction. The orientations of the solar panels 226 may be selectively adjusted on the frame 230, depending for example on the geographical location of the field 14 (e.g., based on a known latitude or geographical region), and/or based on the known angles of the sun at various times of the day or year. In some embodiments the solar panels 226 may be rotated between 0 and 180 degrees to allow for greatest solar inception which varies by time of year. In the illustrated embodiment upright steel tubing supports 237 are mounted to a large rectangular base 235 that provides a base and structural support for transport.

In some embodiments, the pump panel 214 and its controller adjust pumping volume based on solar power availability. For example, when high voltage and power is available from the solar panels 226, but the pump demand is low (e.g., due to a low volume of tail-water being detected in the sump 38 by the depth sensor 218), the pump panel 214 may automatically cause the solar panels 226 to be scrubbed (e.g., the voltage is pulled down) with a large resistor bank, braking transistors, and a relay in the pump panel 214 thereby allowing the motor 118 to operate at an appropriate, lower speed. Conversely, when low voltage and power are available from the solar panels 226 (e.g., due to reduced solar radiation), but the pump demand is high (e.g., due to a high volume of tail-water being detected in the sump 38 by the depth sensor 218), the pump panel 214 may automatically adjust to provide available power without creating faults. Motors, variable frequency drives, and PLC's are susceptible to rapid changes in voltage and cannot handle rapid changes without faulting or damaging components. In some embodiments, the voltage and demand in the system 10, and the elimination of faults, is managed through a combination of PLC programming, the resistor bank, and a DC brake in the pump panel 214.

With reference to FIG. 1, the system 10 also includes transfer piping 238 (e.g., lay flat piping), distribution piping 246 (e.g., lay flat piping), furrows 240, a valve 242 (e.g., a pressure-reducing or pressure-compensating valve with a pressure sensor 250 located at a low pressure side of the valve 242 to measure liquid level and pressure in the distribution piping 246), a line tee 247, a riser or universal hydrant 248, a supply pump 249, and a water source 251. In some embodiments a further meter 252 (e.g., liquid level or flow meter to measure an input flow rate from the distribution piping 246) is provided upstream of the valve 242 (e.g., between the valve 242 and the riser or universal hydrant 248, or between the riser or universal hydrant 248 and the supply pump 249 as illustrated in FIG. 1).

The furrows 240 (or raised beds) are created in the field 14 by a small plow to provide a small hill or berm for plants, which results in furrows for drainage. The furrows 240 are placed parallel to the land slope of the field 14 so that water drains down the furrows 240 toward the first end 22 of the field 14. A single furrow 240 is, for example, about 2 to 12 inches in depth and about 12-24 inches in width. As illustrated in FIG. 1, a drainage ditch with drain furrows 234 is placed at the tail end of all of the furrows 240 to facilitate the movement of water from the furrows 240 to the return pump 26, which is positioned at the lowest point in the field 14. Water is initially placed into the furrows 240 by the distribution piping 246 and flows down the furrows 240, either being absorbed by the soil or leaving the furrow 240 as tail-water through the drain furrows 234. The tail-water then enters through the slots 50 of the return pump 26. The tail-water is then pumped out of the return pump 26 and back toward the distribution piping 246 by the transfer piping 238.

In some embodiments the field 14 includes drains (e.g., at the first end 22) that allow for excess water to freely exit or drain from the field 14. When these drains are blocked or closed during an irrigation event it is referred to as "end blocking." In some embodiments, during irrigation the drains must be blocked. Blocking of the drains is accomplished in a number of fashions as drains are constructed differently, but they are typically a horizontal pipe, a drop pipe (vertical pipe and horizontal pipe), or a flashboard riser. A flashboard riser is a device that allows for boards to be stacked to create a dam in front of the drain pipe. Drains can also be blocked by an automated device. In some embodiments, the drain furrows 234 can store a shallow depth of water, less than 6 inches, until the return pump 26 can return the tail-water. This is referred to as "end blocking" in the field 14. In some embodiments, for the system to function effectively the drains are blocked, and the drain furrows 234 connect the furrows 240 to the sump.

With reference to FIGS. 1 and 2, the transfer piping 238 extends from the return pump 26 toward the first end 18 of the field 14, and toward the distribution piping 246 at the first end 18 of the field 14. The transfer piping 238 may extend above and/or below the ground. In the illustrated embodiment, the transfer piping 238 is a lay-flat polyurethane pipe (as opposed to a hard pipe or gated pipe) that extends above the ground an overall distance 243 (FIG. 2), although other embodiments include different types of pipe (e.g., underground plastic irrigation pipe). In the illustrated embodiment, the transfer piping 238 has a thickness of approximately 20 mm, moves the tail-water approximately 3-6 feet in elevation from the second end 22 to the first end 18 of the field, and moves the tail-water under approximately 1-2 psi of pressure. Other embodiments include different sizes, shapes, and operating conditions.

With reference to FIG. 1, the riser or universal hydrant 248 is connected to the supply pump 249 and to the water source 251. The water source 251 may be of a reservoir type that stores water for withdrawal on demand; a river, stream, or canal; or an underground aquifer. Tail-water that has been received from the transfer piping 238 is connected to the distribution piping 246 and then directed laterally. Valve 242 is connected between the distribution piping 246 and the riser or universal hydrant 248. For example, in the illustrated embodiment, the distribution piping 246 (e.g., crown piping) is used to distribute the tail-water back onto the field 14 to be used again for irrigating the crops in the field 14. In the illustrated embodiment, the distribution piping 246 is lay-flat piping, although other embodiments include different types of piping.

In some embodiments a burst pressure of the lay-flat distribution piping 246 is 6 feet of head. The transfer piping 238 may optionally have higher burst pressure, but the pressure in the transfer piping 238 is still limited by the burst pressure of distribution piping 246. Thus, the system 10 may operate on a pressure that allows for the use of the low-cost transfer piping 238, 246 and the pressure relief element 194 is set to limit the delivery pressure of the pump 78 below the burst pressure. In some embodiments rigid above-ground or below-ground pipes are used to accommodate higher pressure in piping that extends from the supply pump 249 to the riser or universal hydrant 248. In such case, the valve 242 is set to reduce the operating pressure prior to entering distribution piping 246 and thereby prevent bursting of the lay-flat pipe in the irrigation system 10.

With continued reference to FIG. 1, in some embodiments the lay-flat distribution piping 246 includes apertures spaced along the distribution piping 246 that permit water to flow out of the distribution piping 246 and onto the field 14 (e.g., in the direction of the arrows in FIG. 1), to irrigate the crops in the field 14 (e.g., at 2 acre-inch/acre to the field). The water flows over the field, toward the second end 22 of the field, being at least partially absorbed by the field 14 and the crops in the field 14. Any water that reaches the second end 22 of the field 14 is then again directed toward the return pump 26. The lay-flat distribution piping 246 adjusts to changes in flow rate while still maintaining distribution uniformity.

In some embodiments, the size and spacing of the apertures in the distribution piping 246 is determined based on a computerized hole selection program. The size and spacing of the apertures is selected so that a consistent, even distribution of water is delivered to the crops in the field 14. In some embodiments, the apertures are approximately ⅜" in diameter, although other embodiments include different values and ranges (e.g., ¼" to 1", in ¹⁄₆₄" steps).

With reference to FIG. 1, in some embodiments the system also includes a check valve 505 and/or a meter 510 (e.g., liquid level or flow meter to measure an output flow rate of the return pump 26). Tail-water that is pumped from the return pump 26 is moved through the check valve 505, such that the check valve 505 prevents or inhibits the tail-water from falling back toward the return pump 26. In some embodiments the system includes a first meter (e.g., meter 252) to measure an input flow rate from the distribution piping and a second meter (e.g., meter 510) to measure an output flow rate of the return pump.

With reference to FIGS. 11A-11E, in the illustrated embodiment the valve 242 is a butterfly valve that includes a body 300 (e.g., tubular body) having a first end 301 and a second end 302, a disk 303 disposed within the body 300 between the first end 301 and the second end 302, and an actuator 304 (e.g., linear hydraulic, etc.) coupled to the body 300 that controls movement of the disk 303. As illustrated in FIGS. 11A-E, a shaft 308 and arm 314 are coupled to the disk 303 and to the actuator 304. Actuation of the actuator 304 causes movement of the arm 314, the shaft 308, and the disk 303 to open or close the valve 242. Other embodiments of the valve 242 including a worm gear, threaded rod, or other mechanical reduction mechanism, or a motor and threaded mechanisms to create enough leverage to close the valve 242. In some embodiments a brushless motor or a stepper motor are provided. In some embodiments, the disk 303 of the valve 242 is set in a first position to reduce the head from the transfer piping 238 to a user-selectable pressure or maximum of 1 meter when the return pump 26 is not operating, and in a second position that varies in response to a sensed pressure in the distribution piping 246 to maintain the head at a maximum of 1 meter when the return pump 26 is operating.

Figure 11A:
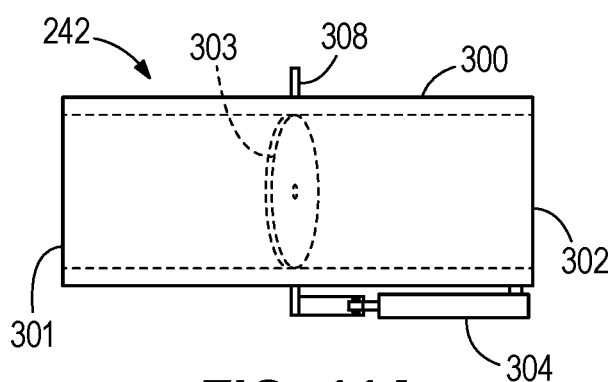
FIGS. 11A-E are schematic views of a pressure-reducing valve of the system.
Figure 11B:
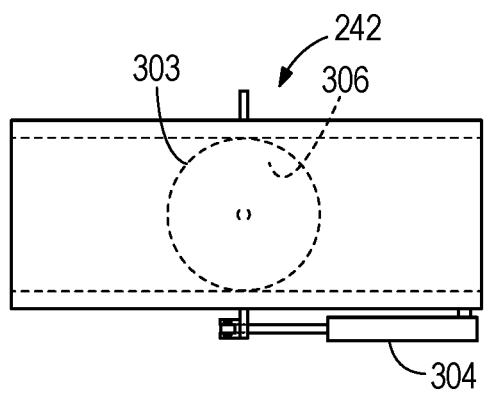
Figure 11C:
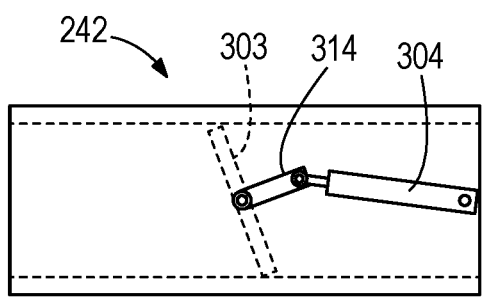
Figure 11D:
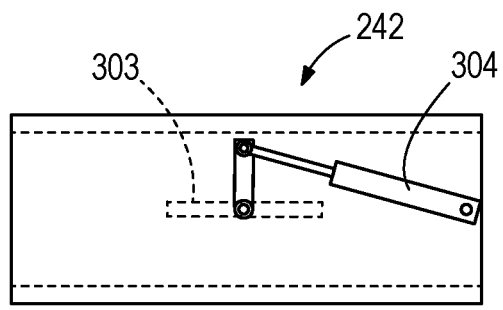
Figure 11E:
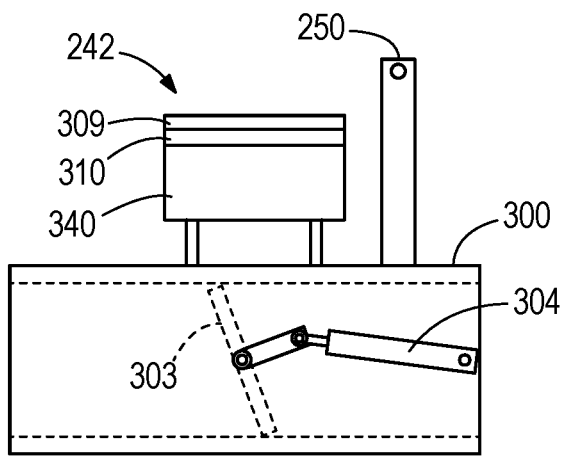

With reference to FIG. 11E, in some embodiments the valve 242 includes a solar power supply 309 and/or other power supply 310, and a semi-hermetic enclosure 340 that includes electronics. The enclosure 340 is mounted to the body 300 and to the disk 303. Energy generated by the solar power supply 309 (e.g., from the solar panels 226) or from the other power supply 310 may be used to actuate the movement of the disk 303. In some embodiments, the valve 242 may be either grid-connected or solar powered with a backup battery. Since the energy required to operate the actuator 304 is small, the preferred design includes a small photovoltaic solar panel atop the valve 242, which applies power to a rechargeable battery. It is desirable to minimize the energy consumption of the valve 242, such that a relatively small solar panel and battery may be used. Various control methods may be used to minimize power consumption while operating the valve 242. For example, with proportional-integral-derivative (PID) control a proportional band and resets per minute may be programmed to minimize oscillations of closure of the valve 242 about a set point. Fuzzy logic or other such control techniques may be equally or more successful in maintaining pressure while minimizing energy consumption. In some embodiments, an embedded microprocessor can be used to manage closure of the valve 242 by accepting measurements from the pressure sensor 250, calculating a logic function from these measurements and then sending the results out to electronically controlled switches that energize the actuator of valve 242 as required.

In some embodiments, the valve 242 includes a controller (e.g., an embedded microprocessor, relays, H-bridge or motor controller integrated circuits within the enclosure 340) to implement the control functions and to energize and de-energize the actuator 304 as needed. The controller may also control the pump panel 214, or communicate with a controller of the pump panel 214. In some embodiments the controller includes a memory that collects and time stamps information collected from one or more sensors. The controller may include a rotary encoder and liquid crystal display (LCD) screen and menu to provide input to the valve 242. In some embodiments the controller includes a timing feature that allows the user to set the amount of time for irrigation to be executed. When this time is reached, the controller may close the valve 242 and end the irrigation set. The controller may be programmed through an external interface wirelessly, or alternatively the valve 242 may include a user interface supported by a mobile device.

The valve 242 preferably includes a circuit that accepts measurements from the pressure sensor 250 and determines whether the height of the water column or system pressure is above or below the set point pressure. The set point is established by moving the sensor fixture to the height desired by the irrigator or the irrigation plan, typically between 0.3 m and 1 m (or 3 ft). When pressure is above (exceeds) the set point, the system will energize an actuator or motor (e.g., the actuator 304) to incrementally close the valve 242. Alternatively, when measured pressure is below the set point, the system will energize the actuator or motor to incrementally open the valve 242. In some embodiments, the valve 242 includes a lever and a support structure for the motor or actuator 304. In some embodiments the valve 242 includes a threaded shaft and a receiver to actuate the valve 242, whereas in other embodiments movement is accomplished by simple lever action of an actuator, and in other embodiments it is accomplished by a gear reduction between a motor shaft and valve shaft.

Figure 11F:
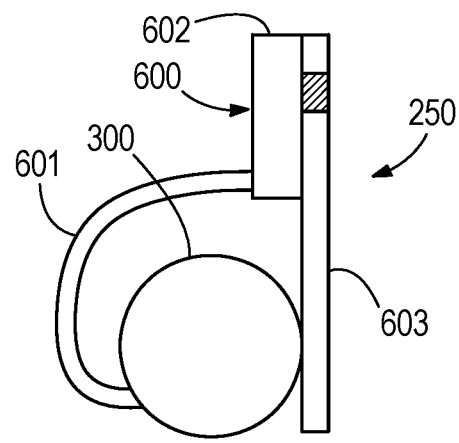
FIG. 11F is a schematic view of a water pressure sensor of the system.

In some embodiments the pressure sensor 250 includes sensor contained in a small sensor pipe where water is allowed to equilibrate. The sensor pipe is connected to the valve 242 by flexible tubing 601. In another embodiment the connection is rigid and the sensor is moved to the set point along the pipe. In some embodiments the pressure sensor 250 only operates over a small pressure or water column height of around 1 meter. With reference to FIGS. 11E and 11F, in the illustrated embodiment the pressure sensor 250 includes a closed end sensor tube 600, a flexible tubing 601, a sensor 602, and a fixed rod all located on a downstream side of the valve 242.

With reference to FIGS. 1 and 11A-11F, in a first operating condition, water pumped from the water source 251 flows through the riser or universal hydrant 248 while the pump 26 is not operating. In this case, and as illustrated in FIG. 11F, water creates pressure in the closed end tube 600 after traveling through the flexible tubing 601. The sensor 602 (e.g., pressure, resistance, or capacitance) located in the closed-end sensor tube 600 senses the water column which represents the pressure in the irrigation distribution piping 246. The signal is conveyed to electronics located in the enclosure 340 (e.g., by wire). In the first case when pressure is low and the distribution piping 246 is filling, the pressure and the water depth in the sensor tube 600 will be low and the disk 303 will be incrementally opened. In the second case when the pressure is high and the distribution piping 246 has extra flow and pressure being provided by the return pump 26, the pressure and water level in the sensor tube 600 is high and the disk 303 will be incrementally closed by the actuator 304 extending. Thus, in conditions between the first and second conditions the controls react to the sensor tube 600 measurements to maintain the system pressure. The system pressure is adjusted by the irrigator by moving the sensor tube 600 up or down along the support rod 603 that is fixed to the body 300. The flexible tubing 601 allows for this movement. Other embodiments may provide for the sensor tube 600 to be directly attached to the body 300 and pivot at the connection.

In some embodiments, the diameter of the body 300 may be sized to enable ready attachment to inlet piping and outlet piping, such as piping between the valve 242 and the pressure sensor 250.

Figure 12:
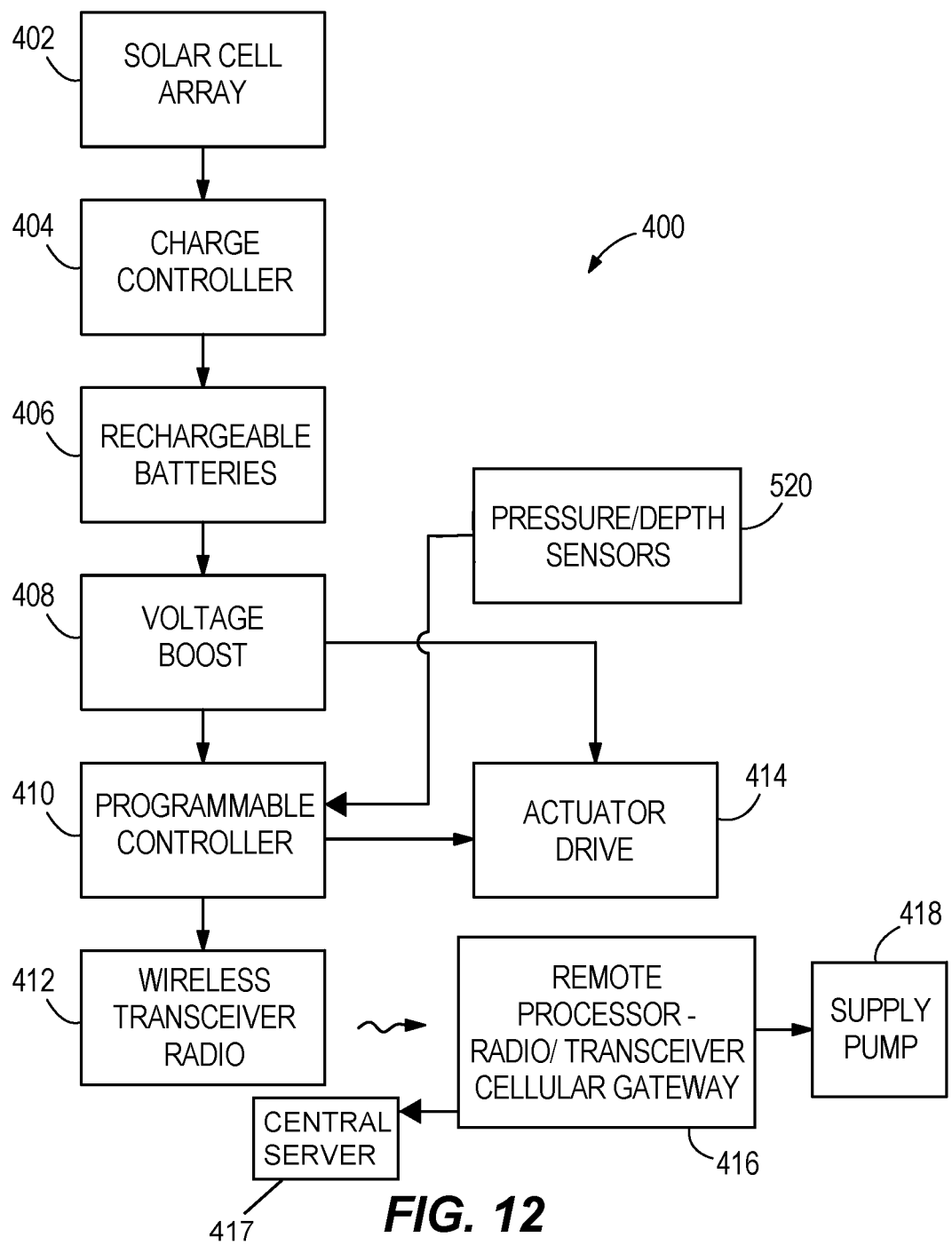
FIG. 12 is a flow chart illustrating operation of the pressure-reducing valve system.

With reference to FIG. 12, a representative block diagram of a valve controller and/or circuit 400 included in the valve 242 (e.g., at least partially within the enclosure 340) includes one or more solar cells, an external solar cell 402, a charge controller 404, batteries (e.g., rechargeable lithium) or a super capacitor bank 406, and an actuator drive 414 (e.g., a motor). In some embodiments, the charge controller 404 includes all components necessary to convert output from the external solar cell 402 to a voltage necessary to charge the battery 406. In some embodiments a voltage boost 408 (e.g., via a buck regulator) increases battery voltage to higher voltage to operate the actuator drive 414. For example, with the battery 406 having a nominal output voltage of 3.8 volts, the voltage is bucked or increased to 12 volts needed to operator the actuator drive 414. As is well known in the industry, charge controller 404 prevents excessive rate of charging battery 406.

FIG. 12 also schematically illustrates a control process for the valve 242. For example, as illustrated in FIG. 12, in some embodiments the external solar cell 402 (e.g. from one of the solar panels 226 described above, or a different solar panel) is coupled to the charge controller 404 (which regulates voltage and current to the batteries or super capacitor bank 406. In some embodiments, voltage from a lithium battery or supercapacitor bank may be, for example, 3.5 to 4.5 volts, although other embodiments include different values. In the illustrated embodiment, a buck regulator is used to increase and boost the voltage to 12 volts to operate actuator drive 414. The voltage is then used to power a relay or motor driver, such as an H bridge. A programmable microcontroller 410 accesses measurement of water depth or pressure from a sensor 520 (e.g., the sensor 602 described above or a different sensor), and executes logic to determine when and by how much to move an actuator drive 414 (e.g., for the actuator 304 described above), which then opens or closes the valve 242. Both sensor measurements and valve 242 position can be transmitted wirelessly by a wireless transceiver radio 412 to a remote communication subsystem (e.g., Wireless Fidelity) configured to transmit collected information to another location. In some embodiments, the microcontroller may send information via the radio 413 to a remote processor and transceiver 416. In some embodiments, the remote processor and transceiver 416 may be located on a tail-water or supply pump 418 (e.g., the supply pump 249 described above). In some embodiments, the remote processor and transceiver 416 may be co-located with a central server 417, and the received information may be employed to enable system automation. In some embodiments, information from the valve 242 may be provided to an irrigator by way of an internet server that can be accessed via the internet or smart phone cellular connection.

With reference to FIGS. 1 and 10, in some embodiments, the system 10 may be automated to the extent that the pump 78 in the sump 38 responds to inputs from the depth sensor 218 in the sump 38 to determine when to turn on or off and speed up or down, and the valve 242 responds to inputs from the sensor 520 (e.g., liquid level sensor 602) to determine when to adjust closure. Additional control may be used to determine when to turn on the supply pump 249 and initiate an irrigation set. The decision to initiate an irrigation set may be done manually, with evaluation leading to such a decision completed once every few days during a growing season. However, full automation of the system 10 may be desirable. The objective is to maintain a field 14 with the proper amount of water necessary for crop growth, preventing both under-watering and over-watering that can have significant impact on crop yield.

With reference to FIG. 1, full automation may be implemented by incorporating sensors 520 (e.g., flow sensors) to measure the extent to which irrigation is needed, along with a controller similar to microcontroller 410 (e.g., embedded in the sensor 520, a gateway 416 located at the return pump 26, at the valve 242, or elsewhere) to make computations and control startup or shutdown of the return pump 26. For example, moisture sensors, weather-based evapotranspiration (ET) controllers, and rain sensors may be distributed in one or more locations within field 14. Connecting the return pump 26, monitor and valve 242 together by wireless means for reporting and control to automate the process provides efficient use and results.

In cases where system 10 includes an embedded controller, it may also be desirable to remotely communicate both sensor readings and status as a function of time. Various wireless transmission protocols may be used. For example, radio frequency band, cellular, and Wireless Fidelity (WiFi) are commonly used wireless communication protocol that may be used. This capability would allow for remote monitoring and control of the irrigation initiation, cessation, duration, and status.

Information wirelessly transmitted from the system 10 to a remote processor may be used simply for information, or may be incorporated into a predictive model to determine when to initiate and terminate an irrigation set. Data applied to develop a predictive model may include either of both of first data and second data, wherein first data is received from a plurality of sensor devices located on the field 14, and second data is received from one or more devices or information services located external to the field 14.

In some embodiments, a computer-readable or microcontroller medium may store instructions, the instructions including a group of instructions, which, when executed by a processor of a device, cause the processor to receive data, the data including first data and second data.

The system 10 may be advantageously used to capture and return a portion of runoff following a rainfall event to the field 14. It is well known that it is not possible to capture all rainfall without incurring impractical investments in water storage facilities. Again, the volume and duration of tail-water following rainfall is variable and unpredictable, and may easily overwhelm any reasonable storage facility. On the other hand, tail-water runoff may accumulate following a steady, gentle rainfall. When the system 10 is operable, a portion of such tail-water can be pumped back to field 14. In some constructions 20 percent of all rainfall that occurs during the growing season may be captured and returned to field 14, although other values and ranges are also possible. This is a significant amount of water and will result in reduced demand from the water source 251. Depending on the exact implementation of various sensor types and method of data collection, information on the amount of rainfall as well as the amount of tail-water due to rainfall that is returned to field 14 may be incorporated into decision-making on when to initiate an irrigation set.

Overall, the system 10 advantageously: (1) has the ability to adjust to a wide range and varying quantities of tail-water runoff (e.g., based on the ability to change speeds of the motor 118 using the depth sensors 218, and/or based on the ability to adjust based on available solar power or other power as described above); (2) requires a small footprint (e.g., less than 10 square feet as described above); (3) uses lay-flat irrigation piping, greatly reducing the capital cost of reusing tail-water; (4) can be powered on-grid or by off-grid electric generator or solar power as described above; (5) may be completely automated without requiring priming; (6) can greatly improve the irrigation efficiency of furrow irrigation, notorious for low irrigation efficiencies and high tail-water ratios; (7) can reduce requirement for irrigation by returning a portion of tail-water following rainfall to the field; and (8) can provide information enabling automated decision-making on when to initiate an irrigation set.

What is claimed is:

1. A gravity irrigation system comprising:
   a distribution piping having apertures to distribute water to a field;
   a valve located upstream of the distribution piping, the valve configured to limit a pressure of the water being delivered to the distribution piping;
   a sump configured to receive the water at a lowest elevation of the field;
   a depth sensor disposed within the sump;
   a return pump disposed at least partially within the sump and configured to move the water to an elevated portion of the field;
   a motor configured to drive the return pump;
   a power source coupled to a variable frequency drive, wherein the variable frequency drive is configured to power the motor and control a motor speed proportionately to an indication of the depth sensor; and
   a transfer piping coupled to an outlet of the return pump and configured to bring the water from the return pump to a check valve and from there to the distribution piping at a low pressure side of the valve.

2. The gravity irrigation system of claim 1, wherein the return pump has a maximum dynamic head of 5 feet while outputting at least 600 gallons per minute.

3. The gravity irrigation system of claim 2, wherein the motor to drive the return pump has a maximum of 3 horsepower.

4. The gravity irrigation system of claim 1, wherein the system includes a first meter to measure an input flow rate from the distribution piping and a second meter to measure an output flow rate of the return pump.

5. The gravity irrigation system of claim 1, wherein the valve is a butterfly valve.

6. The gravity irrigation system of claim 5, wherein the butterfly valve is set in a first position to reduce a head from the transfer piping to a maximum of 5 feet when the return pump is not operating, and in a second position that varies in response to a sensed pressure in the distribution piping to maintain the head at a maximum of 5 feet when the return pump is operating.

7. The gravity irrigation system of claim 1, wherein a pressure relief element is disposed at the outlet of the return pump to return water to the sump when an output pressure of the return pump exceeds a set point.

8. The gravity irrigation system of claim 1, wherein the distribution piping is 10 mil thick lay-flat polyurethane piping.

9. The gravity irrigation system of claim 8, wherein the apertures are aligned with furrows in the field and are custom-sized to uniformly distribute water to every furrow.

10. The gravity irrigation system of claim 1, wherein the power source coupled to the variable frequency drive is a wire coupled to an electrical grid.

11. The gravity irrigation system of claim 1, wherein the power source coupled to the variable frequency drive is a wire coupled to the output of an electrical generator powered by an internal combustion engine.

12. The gravity irrigation system of claim 1, wherein said power source coupled to the variable frequency drive is a wire coupled alternately to an electrical grid or the output of a solar photovoltaic array.

13. The gravity irrigation system of claim 1, further comprising a support structure built atop and attached to the sump to support the return pump, the attached motor, and the variable frequency drive.

14. The gravity irrigation system of claim 1, further comprising a pump panel, wherein the overall footprint of the sump, the return pump, and the pump panel is less than 900 square feet.

15. The gravity irrigation system of claim 1, wherein the return pump is formed at least partially of polyvinyl chloride.

16. The gravity irrigation system of claim 15, wherein the return pump further includes a discharge element, a first transition element and a second transition element, wherein each of the discharge element, the first transition element, and the second transition element are formed at least partially of polyvinyl chloride.

* * * * *